(12) United States Patent
Schrichte (10) Patent No.: US 10,977,614 B2
(45) Date of Patent: Apr. 13, 2021

(54) POINT OF SCAN/COPY REDACTION

(75) Inventor: Christopher K. Schrichte, Missoula, MT (US)

(73) Assignee: TeraDact Solutions, Inc., Missoula, MT (US)

( * ) Notice: Subject to any disclaimer, the term of this patent is extended or adjusted under 35 U.S.C. 154(b) by 1172 days.

(21) Appl. No.: 12/454,561

(22) Filed: May 18, 2009

(65) Prior Publication Data

US 2009/0296166 A1    Dec. 3, 2009

Related U.S. Application Data (60) Provisional application No. 61/127,869, filed on May 16, 2008, provisional application No. 61/127,868, filed on May 16, 2008.

(51) Int. Cl.
*G06Q 10/10*    (2012.01)

(52) U.S. Cl.
CPC .................................. *G06Q 10/10* (2013.01)

(58) Field of Classification Search
CPC ...................................................... G06Q 10/10
See application file for complete search history.

(56) References Cited

U.S. PATENT DOCUMENTS

| | | | |
|---|---|---|---|
| 5,235,681 A | 8/1993 | Masuzaki | 345/556 |
| 5,581,682 A | 12/1996 | Anderson | 715/236 |
| 5,903,646 A | 5/1999 | Rackman | 380/4 |
| 5,982,956 A | 11/1999 | Lahmi | |
| 6,279,013 B1 | 8/2001 | LaMarca | |
| 6,449,065 B1 * | 9/2002 | Luther et al. | 358/534 |
| 6,477,550 B1 | 11/2002 | Balasubramaniam | |
| 6,889,205 B1 | 5/2005 | Lamm | 705/40 |
| 7,216,125 B2 | 5/2007 | Goodwin | |
| 7,292,723 B2 | 11/2007 | Tedesco et al. | 382/159 |
| 7,295,988 B1 | 11/2007 | Reeves | |
| 7,428,701 B1 * | 9/2008 | Gavin | G06F 17/241 715/243 |
| 7,590,693 B1 | 9/2009 | Chan et al. | 709/206 |
| 7,624,027 B1 | 11/2009 | Stern | 705/2 |
| 7,627,152 B2 | 12/2009 | Mathew | |
| 7,653,876 B2 | 1/2010 | Ethier et al. | 715/249 |
| 8,078,512 B1 | 12/2011 | Haberaecker | |
| 8,181,261 B2 | 5/2012 | Sperry | |
| 8,521,632 B2 | 8/2013 | Planitzer | |
| 2001/0018739 A1 | 8/2001 | Anderson et al. | 713/176 |
| 2002/0062342 A1 | 5/2002 | Sidles | 709/203 |
| 2002/0065901 A1 | 5/2002 | Goodwin, III | 709/218 |
| 2002/0075505 A1 | 6/2002 | Murray | 358/1.15 |

(Continued)

FOREIGN PATENT DOCUMENTS

NZ    535943    10/2005

OTHER PUBLICATIONS

Xerox, "FlowPort, Installation and Setup Guide, Version 2.1" © Nov. 2000, Xerox, 56 pages.

(Continued)

*Primary Examiner* — King Y Poon
(74) *Attorney, Agent, or Firm* — Harrington & Smith (57) ABSTRACT

A method including scanning a document by a scanner to form a scanned document; determining a form of the document; and redacting a cell of the scanned document based upon the determined form of the document to thereby form a scanned redacted document.

20 Claims, 11 Drawing Sheets

(56) References Cited

U.S. PATENT DOCUMENTS

| | | | |
|---|---|---|---|
| 2002/0083079 A1 | 6/2002 | Meier et al. | 707/104.1 |
| 2002/0091734 A1 | 7/2002 | Redlich et al. | |
| 2002/0158864 A1 | 10/2002 | Matichuk | 345/418 |
| 2002/0188187 A1 | 12/2002 | Jordan | |
| 2003/0014394 A1 | 1/2003 | Fujiwara et al. | 707/3 |
| 2003/0051054 A1 | 3/2003 | Redlich et al. | 709/246 |
| 2003/0084339 A1 | 5/2003 | Roginsky et al. | |
| 2003/0115481 A1 | 6/2003 | Baird et al. | 713/201 |
| 2003/0145017 A1 | 7/2003 | Patton et al. | 707/104.1 |
| 2004/0075692 A1 | 4/2004 | Matichuk | 345/806 |
| 2004/0088313 A1 | 5/2004 | Torres | 707/101 |
| 2004/0139043 A1 | 7/2004 | Lei et al. | 707/1 |
| 2004/0236651 A1 | 11/2004 | Emde et al. | 705/34 |
| 2005/0002053 A1 | 1/2005 | Meador | |
| 2005/0015723 A1 | 1/2005 | Light et al. | |
| 2005/0027495 A1 | 2/2005 | Matichuk | 703/2 |
| 2005/0063615 A1 | 3/2005 | Siegel | |
| 2005/0108351 A1 | 5/2005 | Naick et al. | 709/207 |
| 2005/0111762 A1 | 5/2005 | Mathew | |
| 2005/0246338 A1 | 11/2005 | Bird | 707/9 |
| 2005/0251865 A1 | 11/2005 | Mont | 726/26 |
| 2006/0005017 A1 | 1/2006 | Black | 713/165 |
| 2006/0075228 A1 | 4/2006 | Black et al. | 713/167 |
| 2006/0143459 A1 | 6/2006 | Villaron | |
| 2006/0155863 A1 | 7/2006 | Schmidt | 709/229 |
| 2006/0184522 A1 | 8/2006 | McFarland et al. | 707/5 |
| 2006/0218149 A1 | 9/2006 | Patrick | 707/9 |
| 2006/0242558 A1 | 10/2006 | Racovolis | |
| 2007/0027749 A1 | 2/2007 | Peiro | |
| 2007/0030528 A1* | 2/2007 | Quaeler et al. | 358/453 |
| 2007/0094594 A1 | 4/2007 | Matichuk et al. | 715/530 |
| 2007/0174766 A1 | 7/2007 | Rubin et al. | 715/530 |
| 2007/0219966 A1* | 9/2007 | Baylis et al. | 707/3 |
| 2008/0049271 A1* | 2/2008 | Carlson et al. | 358/498 |
| 2008/0180765 A1* | 7/2008 | Nakashita | 358/498 |
| 2008/0204788 A1 | 8/2008 | Kelly et al. | 358/1.15 |
| 2009/0089192 A1 | 4/2009 | Ferlitsch | 705/33 |
| 2014/0019318 A1 | 1/2014 | Haberaecker | |

OTHER PUBLICATIONS

Xerox, "FlowPort, Administrator Guide," © Apr. 2003, Xerox, 76 pages.

Xerox, "FlowPort, Installation and Setup Guide," © Apr. 2003, Xerox, 62 pages.

Xerox, "FlowPort User Guide, 2.1.1 SP3 Update," © Apr. 2003, Xerox, 159 pages.

* cited by examiner

ARREST REPORT — 16

| NAME OF SUSPECT — 20 | ADDRESS | OCCUPATION |
|---|---|---|
| JOHN DOE | 1278 ELM STREET SPRINGFIELD, VA  19 | COURIER |

| AGE OF SUSPECT — 22 |
|---|
| 32 |

MONITORING — 21

| NAME OF OFFICER — 25 | BADGE | HOME OFFICE OF ARRESTING OFFICER |
|---|---|---|
| HENRY THOMPSON | 1234  24 | SPRINGFIELD, VA |

| TYPE OF ARREST — 28 | FELONY (X) MISDEMEANOR ( )  27 | CONTRABAND SUBSTANCES |
|---|---|---|
| DRUG TRAFFICKING | | COCAINE |

NARRATIVE OF ARREST — 29

| ARREST REPORT | | |
|---|---|---|
| NAME OF SUSPECT | ADDRESS | OCCUPATION |
| JOHN DOE | 1278 ELM STREET SPRINGFIELD, VA  19 | COURIER |
| AGE OF SUSPECT | (SECTION REDACTED) | |
| 32 | 24 | (SECTION REDACTED) |
| (SECTION REDACTED) | TYPE OF ARREST | FELONY (X) MISDEMEANOR ( ) 27 | CONTRABAND SUBSTANCES |
| | DRUG TRAFFICKING | | COCAINE |
| NARRATIVE OF ARREST | | | |

POINT OF SCAN/COPY REDACTION

CROSS REFERENCE TO RELATED APPLICATIONS

This application claims priority under 35 U.S.C. 119(e) on U.S. provisional patent application No. 61/127,869 filed May 16, 2008 and U.S. provisional patent application No. 61/127,868 filed May 16, 2008 which are hereby incorporated by reference in their entireties.

BACKGROUND OF THE INVENTION

Field of the Invention

The invention relates to a system, method and computer program product for creating redacted documents and, more particularly, to an automated redaction system, method and computer program product. The invention also relates to collecting and disseminating information and, more particularly, to information assembled from over the Internet.

Brief Description of Prior Developments

U.S. Pat. No. 6,889,205, which is hereby incorporated by reference in its entirety, discloses a system and method for preparing a redacted statement, message or file from an electronic statement, message or file and sending it to a party. U.S. Patent Publication Nos. 2002/0158864, 2004/0075692, and 2005/0027495, which are hereby incorporated by reference in their entireties, describe automatic creation of graphical representations, and intelligent agents for integrating information access over extended networks.

Businesses as well as Federal, State and Local government agencies must share information. Examples include case files, arrest reports, subpoenaed documents (e.g., Freedom of Information Act—FOIA, Law Enforcement Information Sharing Program—LEISP, etc.) Redacting classified, confidential or secret information from documents can be labor intensive. No effective means of automating the process of removing sensitive information from documents exists. There is a need for a system and method for automatically removing sensitive information from documents; especially a system which can work with different document types.

Information, which is used for marketing products and services, is sometimes gathered from sources on the Internet. Marketing, advertising and sales companies and departments use this information to prepare various reports. However, gathering of this type of product/service information is very time consuming and individualized. There are "data mining" programs which are overly broad in gathering data. There is a need for a more focused, and less labor intensive system and method for gathering product/service/issue related information from sources via the Internet.

SUMMARY

The following summary is merely intended to be exemplary. The summary is not intended to limit the scope of the claimed invention.

In accordance with one aspect of the invention, a method is provided including scanning a document by a scanner to form a scanned document; determining a form of the document; and redacting a cell of the scanned document based upon the determined form of the document to thereby form a scanned redacted document.

In accordance with another aspect of the invention, a method comprising opening an electronic scanned version of a document by a computer; and when the electronic scanned version of the document is opened, automatically redacting a cell of the opened electronic scanned version of the document.

In accordance with another aspect of the invention, a method is provided comprising creating web automated collection parameters and prioritization parameters; collecting data from information locations; assembling collected data as results with prioritization; and making prioritized results available via fee for service online access as assembled virtual portal access on a server.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

System and methods for redacting documents are described in U.S. patent application Ser. No. 11/544,685 filed Oct. 6, 2006 (U.S. Publication No. 2007/0094594 A1) which claims priority on U.S. Provisional Patent Application No. 60/724,986 filed Oct. 6, 2005 which are hereby incorporated by reference in their entireties.

Figures 1, 4:
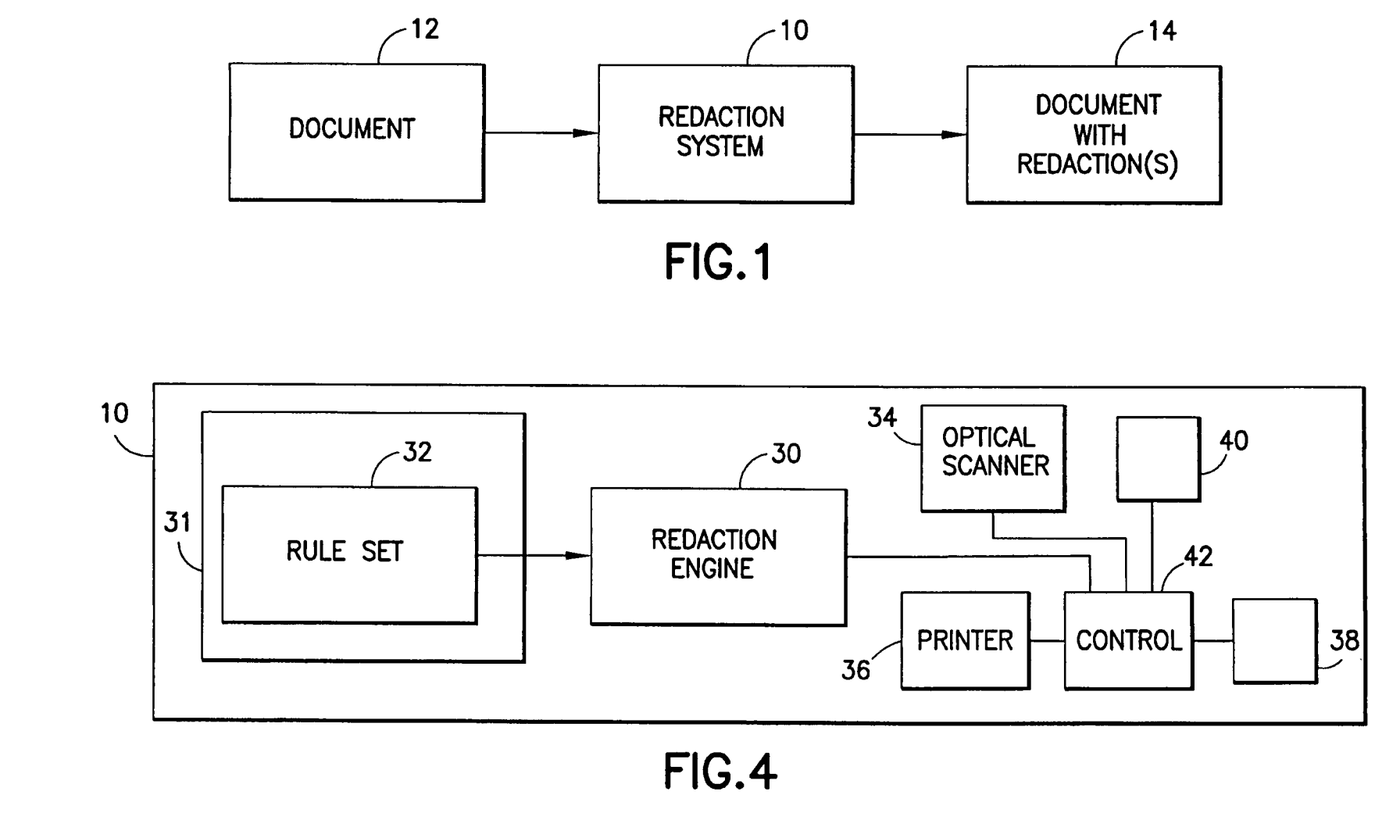
FIG. 1 is a block diagram depicting a redaction system configured to operate in accordance with one example of the invention.
FIG. 4 is a block diagram depicting components of the redaction system comprising an example embodiment of the invention depicted in FIG. 1.

Referring to FIG. 1, there is shown a block diagram of a redaction system 10 incorporating features of the invention. Although the invention will be described with reference to the example embodiments shown in the drawings, it should be understood that the invention can be embodied in many alternate embodiments.

Figure 2:
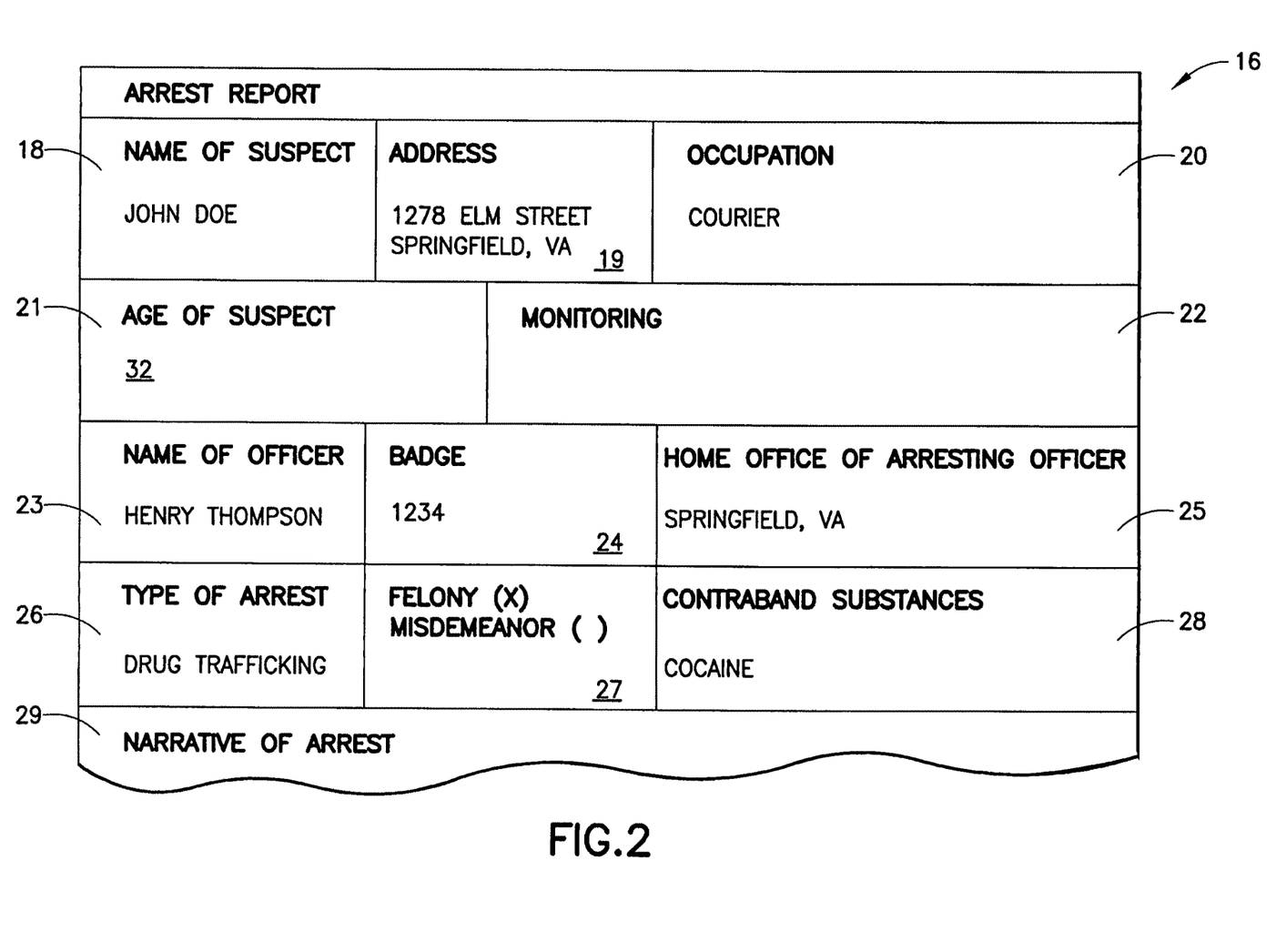
FIG. 2 depicts a document to be redacted by a system operating in accordance with one example of the invention.
Figure 3:
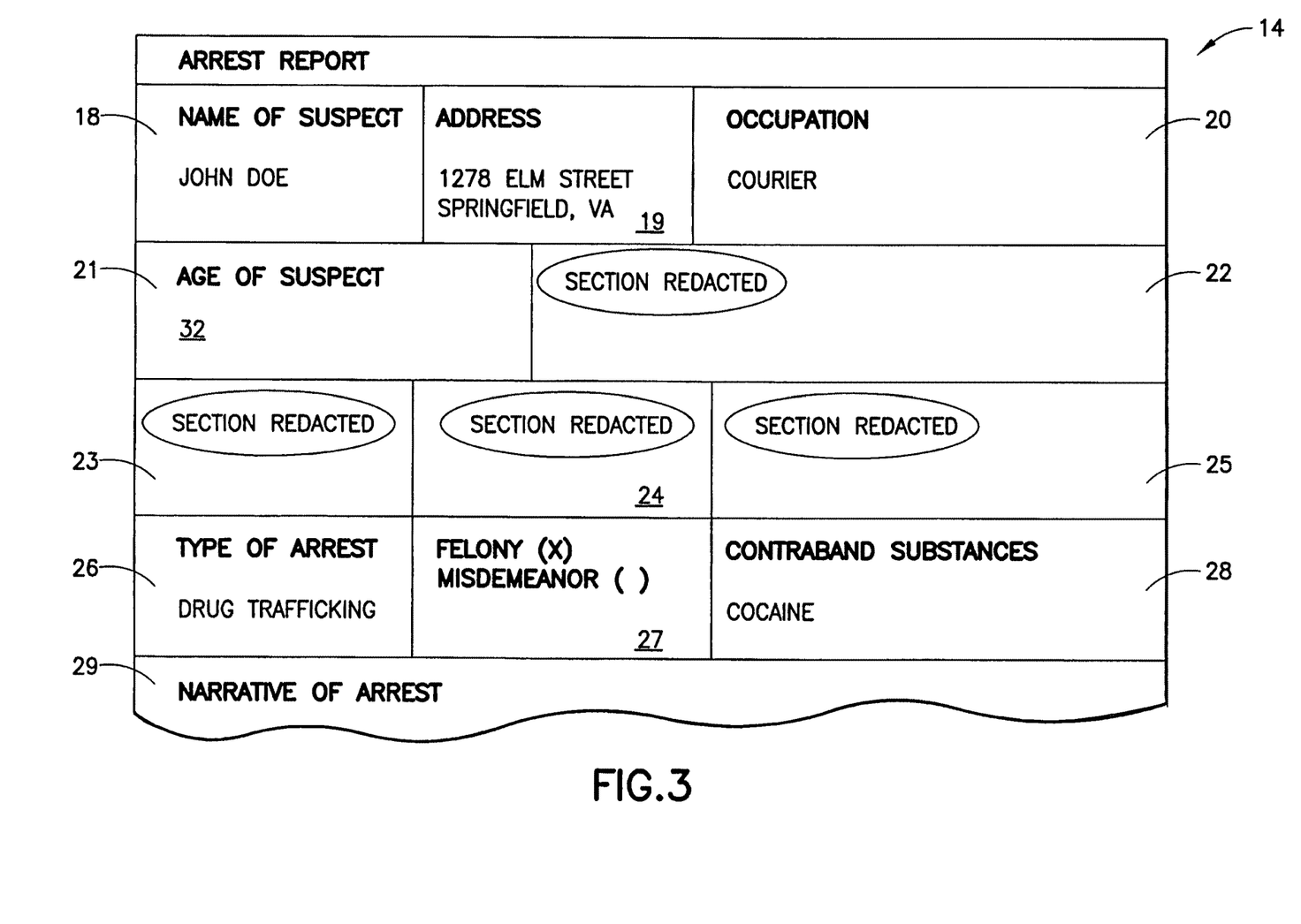
FIG. 3 depicts the document of FIG. 2 in a redacted form generated by a system operating in accordance with one example of the invention.

The redaction system 10 is adapted to process a document 12 to create a modified document 14 with one or more redactions. The document 12 is a physical document, such as a paper form. The modified document 14 is a copy of the document 12, but with one or more portions (such as cells of a form) redacted. The modified document 14 could be a physical paper document or in an electronic form, such as a PDF for example. An example is shown with reference to FIGS. 2 and 3. FIG. 2 shows a portion of an arrest report 16. The arrest report 16 comprises cells 18-29. The cells of a document could be pre-established with borders such as is shown in FIG. 2, or could be established with the software of the invention. As seen with reference to FIG. 3, one or more of the cells or information in the cells can be redacted in a computer generated modified document 14 of the arrest report 16.

Referring also to FIG. 4, the redaction system 10 can comprise a redaction engine 30, a memory 31 having a rule set 32, an optical scanner 34, a printer 36 and a data output 38. The system 10 is preferably a multifunction document machine capable of printing, copying, scanning and faxing. As is know in the art, a multifunction document machine has an internal hard drive 40 and a controller 42, such as a microprocessor, similar to a computer. Features of the invention can be stored as software or a computer program on the multifunction machine. However, features of the invention could be used in a single function machine, such as a digital copier or digital scanner. Features of the invention could also be in a computer or server connected to a digital copier or digital scanner. In a preferred embodiment, the controller 42 is part of the redaction engine.

The redaction engine 30 is adapted to take a scanned version of the document 12, and remove or redact information in the document using rules accessed from the rule set 32 to produce the modified document 14. The rule set 32 comprises a set of rules and/or process models to be applied by the redaction engine 30. In this example embodiment the invention is particularly configured to work with pre-existing physical documents which are in a standardized specific "form" layout. For example, the arrest report form shown in FIG. 2 has specific predefined size and location parameters for each of the cells 18-29. These size and location parameters do not change. The invention uses these fixed cell size and location parameters to assist in redaction.

Figure 5:
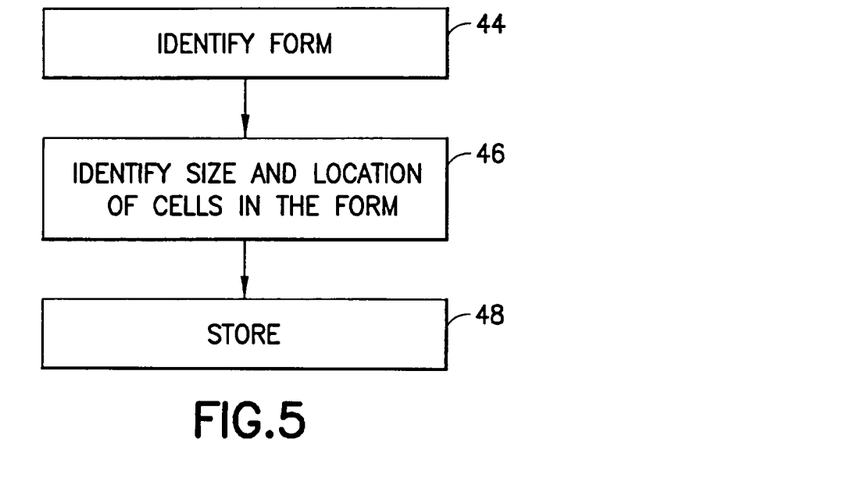
FIG. 5 is a flow chart illustrating steps of one embodiment of the invention.

Referring also to FIG. 5, one example of creation of a rules set 32 includes identification of a form as indicated by block 44. Most forms have a form identifier which can be used for this purpose. For example, form "DD-1351" is a U.S. government travel voucher form. The size and location of each pertinent cell (which might be subsequently desired to be redacted) in the form is identified as indicated by block 46. The identified size and location of the cells to be redacted can be stored in the memory 31 as part of the rules set 32 with the document form identification as indicated by block 48. Different forms will obviously have different pertinent cells or pertinent cell sizes and locations. For example, if the document 12 is a form "A" document it might have only one cell which needs to be redacted if the document 12 is scanned or copied. However, if the document 12 is a form "B" document it might have two cells which need to be redacted if the document 12 is scanned or copied. The process noted with regard to FIG. 5 can be repeated for each form. The stored information of the rules set can be stored in the memory 31 as a look-up table for example.

When a user desires to copy or scan the original document 12, the user uses the optical scanner 34 to first scan or read the document. In order for the redaction system to operate properly, the document scanned by the user is preferably referenced to one of the stored rules in the rule set 32. The invention uses the stored information link (such as a lookup table for example) between the form identification (44) and the pertinent cell identification (46) to automatically determine which cell(s) of the document 12 should be redacted in the subsequently produced redacted document 14.

Figure 6:
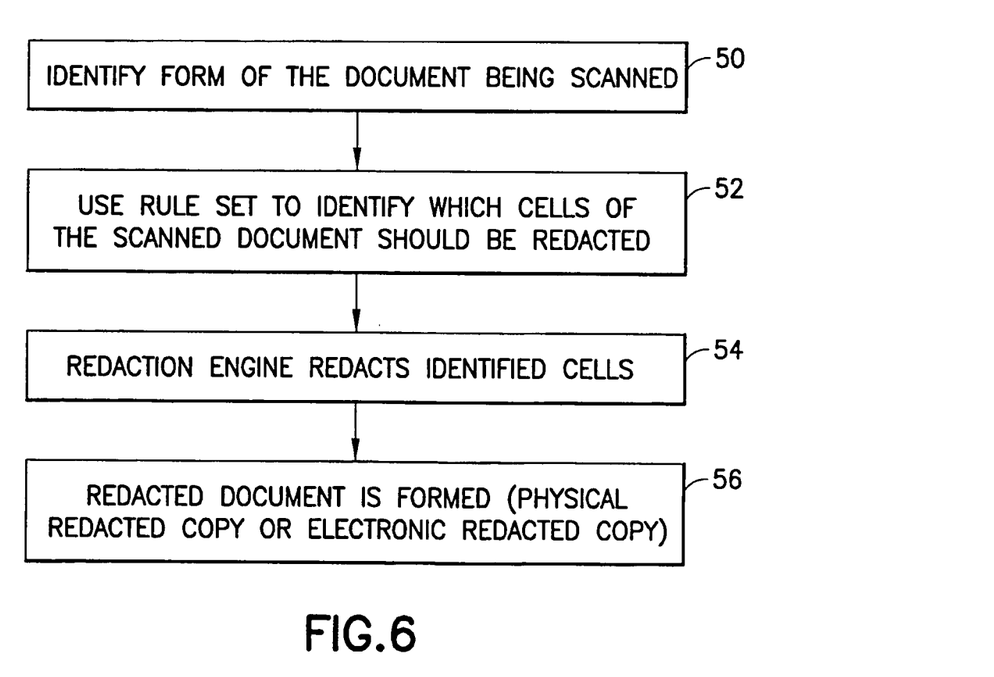
FIG. 6 is a flow chart illustrating steps of one embodiment of the invention.

Referring also to FIG. 6, as indicated by block 50, the form of the document being scanned by the optical scanner 34 is identified. For example, the document being scanned could be identified as a "DD-1351" form. Input of the "form" identification of the document 12 into the redaction system 10 can be manual by a user or automatic. For example, for manual identification of which form the document 12 corresponds to, the user of the machine can input a document form number of the document being read by the scanner 34 into a user input panel of the machine. For automatic document identification, the machine could use OCR (optical character recognition) or identification of a watermark or other indication on the document 12 being read by the scanner 34 to automatically identify the "form" which the document corresponds to.

With the document 12 having been read or scanned by the scanner 34, and the redaction system now knowing the identified 50 the "form" of the scanned document 12, the redaction system can then create the redacted document 14 with the predetermined pertinent cells redacted. As indicated by block 52, the redaction engine uses the rule set to identify which cells of the scanned document 12 should be redacted; based upon the "form" identity of the document 12. The redaction engine then redacts the information in the identified cells as indicated by block 54 and a redacted document 14 is then formed as indicated by block 56. The creation 56 of the redacted document 14 can comprise printing the redacted document by the printer section 36 of the machine as a redacted copy of the document 12 and/or creating an electronic redacted copy of the document 12; both having the pertinent cells redacted.

For example, U.S. government travel vouchers are a form DD-1351. The form includes cells for a person to sign the voucher and a cell having the government employee's social security number. With use of the invention, if the travel voucher is copied or scanned, the signature cell and the social security number cell can be redacted at the time of copying or scanning. Thus, there is less risk that the copy (physical or electronic) will be released still having the employee's signature or social security number on it. As another example, medical forms have private information cells which can be automatically redacted at the point of creation of a copy (physical or electronic) of the original physical document. Thus, in one type of automatic redaction, a person's name and address could be redacted. In another type of redaction for the same form, a person's social security number could merely be redacted. The system, by using more than one rule set, could create more than one redacted document at the same time (electronic document and/or non-electronic document); each redacted document having at least one different cell redacted or not redacted. This can help an organization comply with HIPAA (Health Insurance Portability and Accountability Act) regulations and other privacy act requirements.

One of the features of the invention is the ability to create redacted copies of documents at the point in time of creation of the copy. When the copy is an electronic copy, this allows the redacted copy to be easily "pushed" into a document management system. For example, in a doctor's office, after a document is created based upon a form, it can be scanned into a document management system in the doctor's office as a redacted document. If desired, a non-redacted copy of the document could also be stored in a secured location in the document management system which would only be accessible when certain additional security checks are made. Thus, by scanning the document 12 once, both a redacted document copy and a non-redacted document copy could be formed and stored in separate electronic locations.

Figure 7:
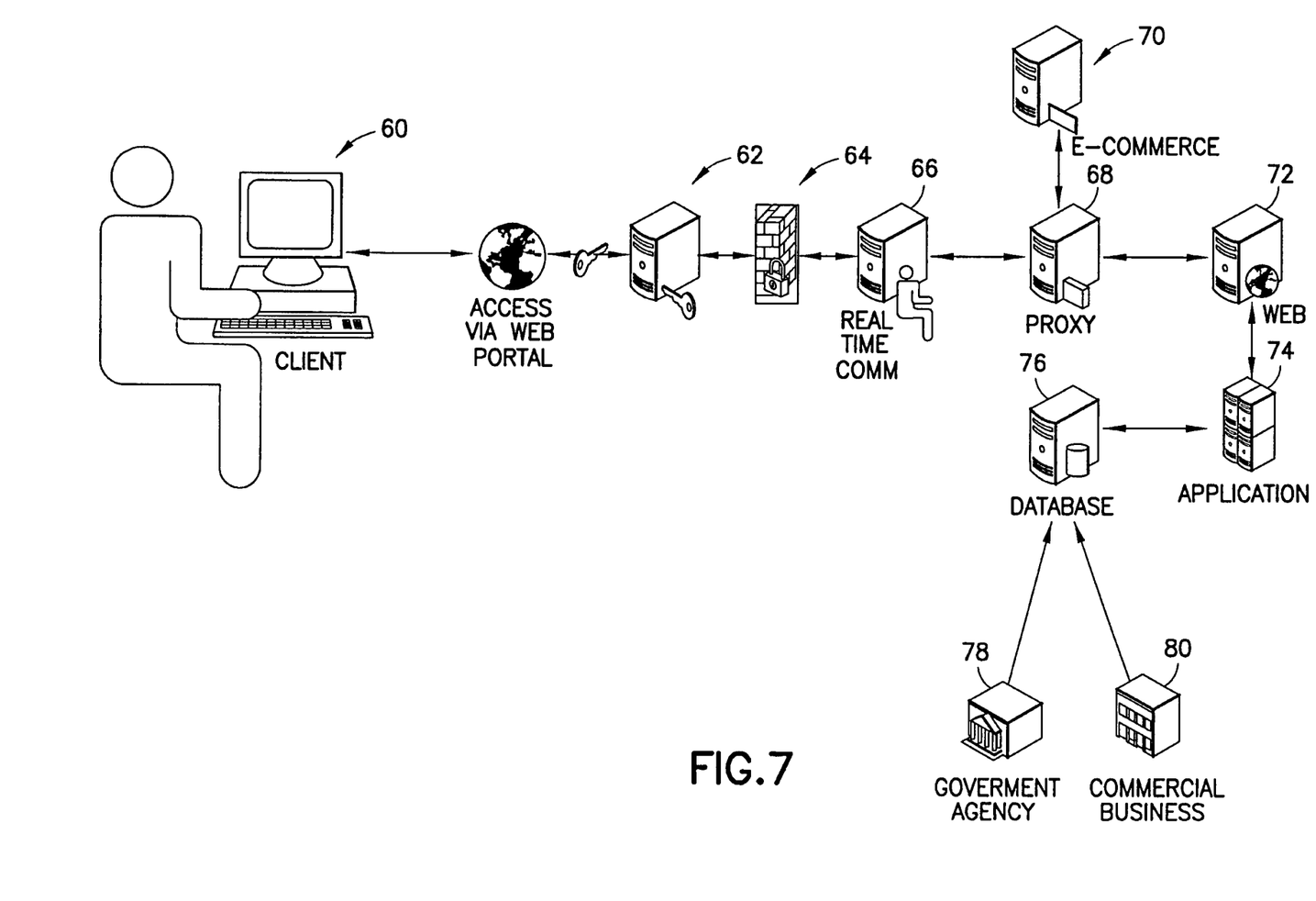
FIG. 7 is a diagram illustration connection of various devices.

Referring also to FIG. 7, a diagram illustrating some of the features of the invention is shown regarding registration and usage of one possible commercial redaction system 5 which forms a virtual redaction portal (VRP). A client 60 can connect via encryption software, such as PKI or PGP keys as indicated by 62, but would be otherwise blocked as indicated by 64. As indicated by 66, real time communications can be provided via a proxy 68 which can be connected to an E-commerce provider 70, such as PAYPAL™ for example.

The client 60 can register with the service provider, and can pay an initial fee. After registration, the client 60 can download a visual editor software program or plug-in, such as TERADACTOR VISUAL EDITOR™ (TVE) for example. As another example, the plug-in could be a word processing tool which is used on-demand via a session. The visual editor software program can stay resident, but inoperable, on the client computer until a work session is activated. This software can connect via the web 72 to one or more applications 74 of the VRP which are connected to a database 76 having redacted documents.

A client work session can initially start with the client connecting and authenticating to the VRP. The client can submit one or more documents from the computer to the VRP for redaction services by the VRP. The client can enter redaction requirements via a rule set graphical user interface (GUI) for example. The redaction request can be processed by the VRP and results returned for the client review and retrieval.

In an alternate scenario, the client can request that a copy of the document be maintained in a document store 76 or available via connection to a government agency 78 for example. Redactions can be performed based upon one or more prior defined rule set. The document can then be processed and delivered for review and retrieval.

In an alternate scenario, a commercial business 80 or government agency 78 can submit documents for redaction via paper or electronic media. The rules sets can be developed based upon client requirements. Redactions can be processed and then reviewed at the VRP. Samples or the entire output can be made available to the client for review and approval. The redacted documents can be delivered and originals might be destroyed.

Figure 7A:
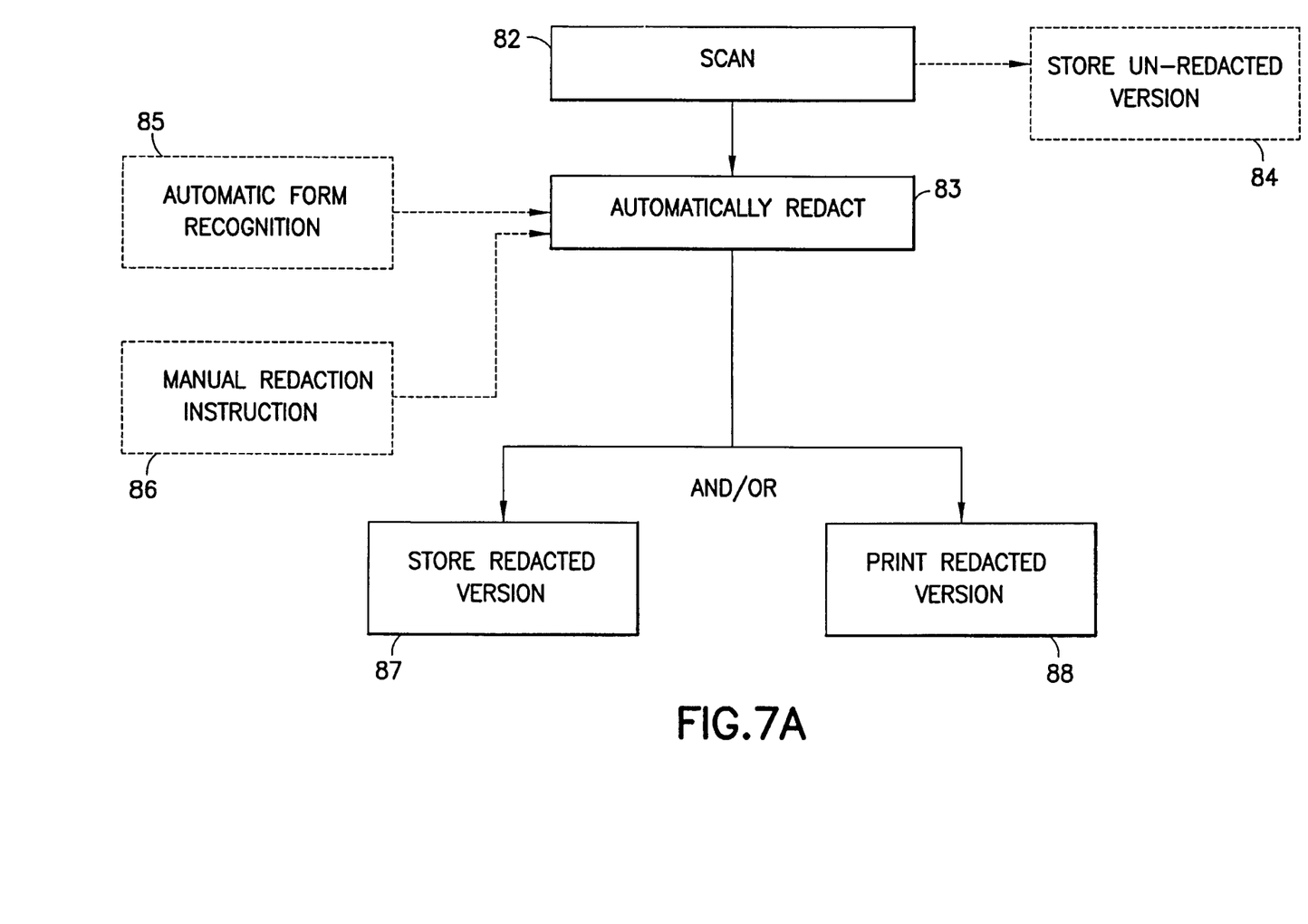
FIG. 7A is a flow chart of some steps of one example of the invention.

As seen with FIG. 7A, an example method of the invention can comprise scanning a document as indicated by block 82, and doing an automatic redaction as indicated by block 83. After scanning, an un-redacted version can be stored as indicated by block 84. The redaction step 83 can comprise automatic form recognition 85 and/or manual redaction instructions 86. The resultant redacted version of the document can be stored 87 and/or printed 88.

Figure 7B:
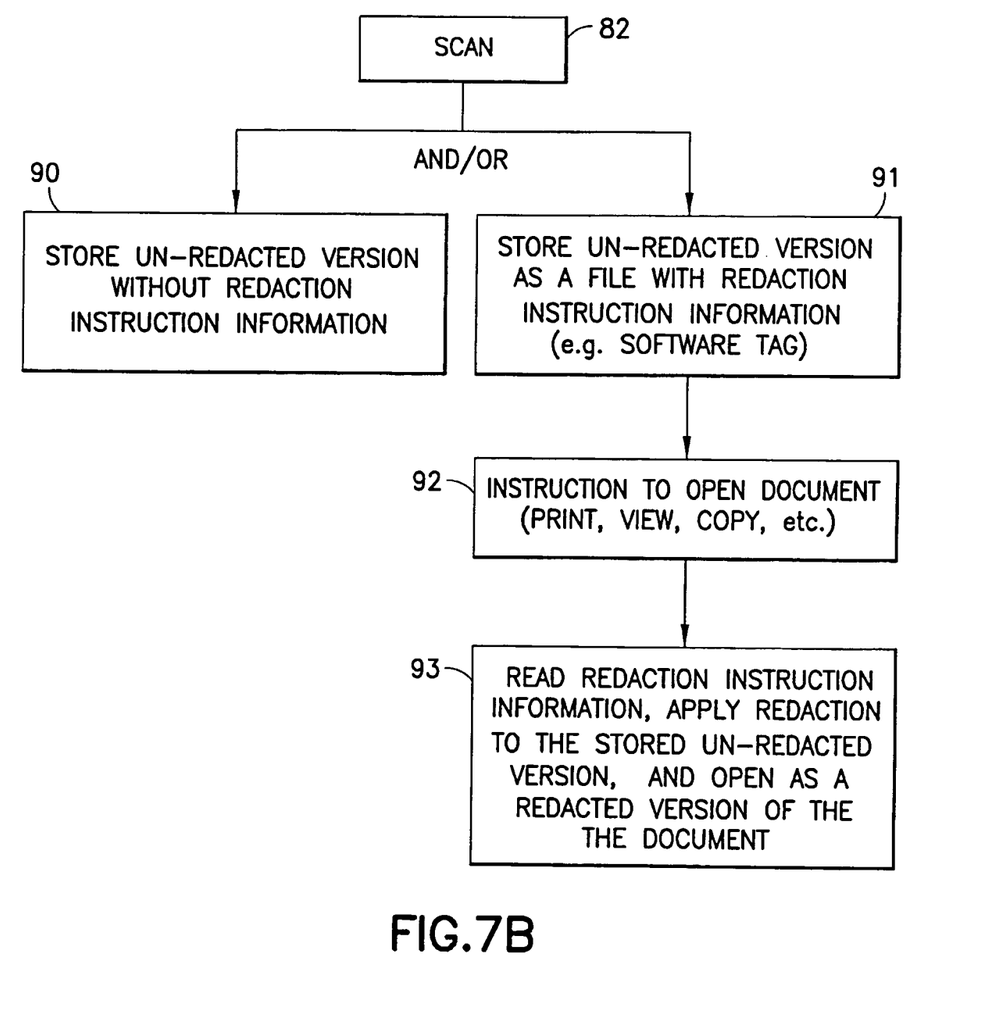
FIG. 7B is a flow chart of some steps of one example of the invention.

Referring also to FIG. 7B, an example method of the invention can comprise scanning a document as indicated by block 82, storing an un-redacted version of the document without any redaction instruction information as indicated by block 90 and/or storing an un-redacted version of the document as a file with redaction instruction information as indicated by block 91. The redaction instruction information could be a software tag for example, or the file could be stored as a specific form of file which could only be opened with specific software. As an analogy, a PDF must be opened with PDF software or a PDF plug-in. When there is an instruction to open the file as indicated by block 92, as indicated by block 93 the redaction instruction information can be read, redaction can be automatically applied to the stored un-redacted version of the document, and a resultant redacted version of the document will open. This method is well suited to the system shown in FIG. 7.

Business Intelligence Portal

Figure 8:
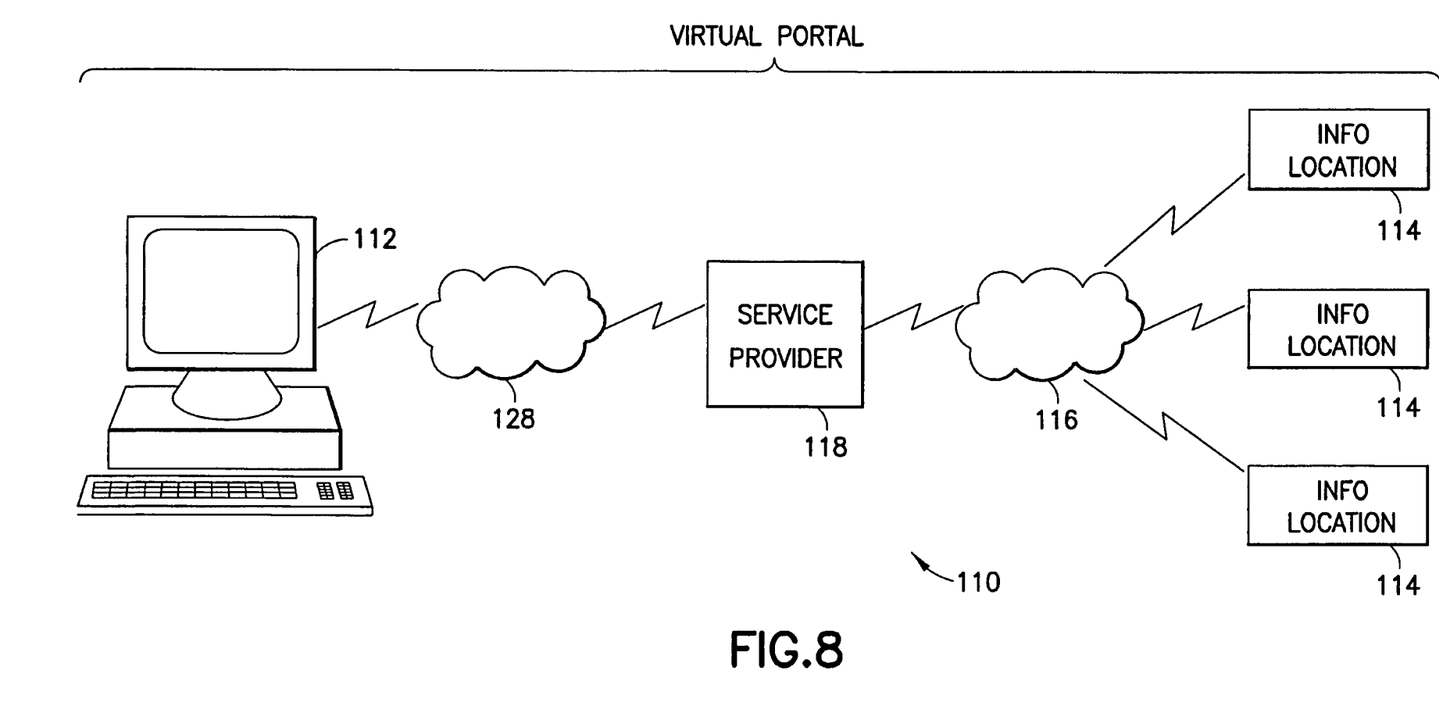
FIG. 8 is a diagram illustrating some components in one example of a virtual portal.

Referring to FIG. 8, there is shown a diagram of a system 110 incorporating features of the invention. The system 110 is adapted to provide an assembled information virtual portal between an end user computer 112 and information locations 114. The end user computer 112 could be at a marketing department of a company for example. The information locations 114 can include web locations such as Blog sites, news sites, competitor web sites, consumer information or advocacy web sites, social network web sites, or specialty web portals for example. The locations 114 are accessible via the Internet 116 or other suitable data connection.

Figure 9:
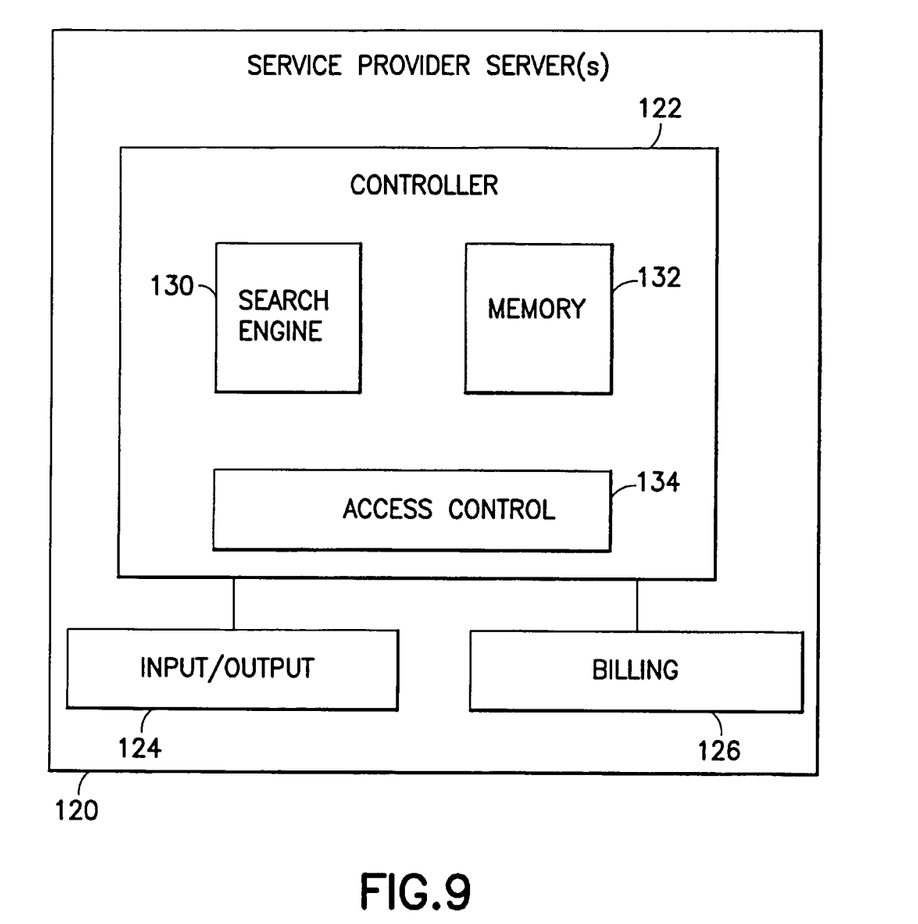
FIG. 9 is a diagram illustrating some components of a service provider server(s) in one example of the invention.

The assembled information virtual portal comprises a service provider 118. Referring also to FIG. 9, the service provider comprises one or more computer servers 120. The server 20 includes a controller 122, an input/output section 124 and a billing section 126. The input/output section 124 connects the server 120 to the Internet 116 and to a connection 128 (see FIG. 8) to the end user computer 112. The connection 128 could be the Internet or any other suitable data connection link(s). The controller 122 includes a search engine section 130, a memory section 132 and an access control section 134. It should be noted that portions of these sections could be common to one another and are not necessarily totally separate.

The service provided by the service provider 118 is preferably a fee for service type of service. The end user will pay the service provider 118 for the virtual portal and other services which the service provider 118 will make available to the end user computer 112 via the link 128. Access control 134 can limit access to the viewable/downloadable results based upon data from the billing section 126. One of the services provided by the service provider is the searching of the information locations 114 for targeted type of data, assembly of that data in a prioritized or organized fashion, and making the data available to the end user's computer 112 as a virtual portal to the information locations 114; the virtual portal providing access to screened and prioritized data on the information locations 114.

Initially, the end user will identify, to the service provider, the type of information it is looking for. For example, if the end user is a company which sells widgets, the end user might ask for all information which the service provider can find relating to widgets. As another example, if the end user is a company which sells a specific model "A" car, the end user might ask for all information which the service provider can find relating to model "A" car, such as news reports, Blog entries, competitor's comments, etc. Similarly, if a competitor sells the model "A" car, the end user might ask for all information which the service provider can find relating to the competitor's model "A" car, such as news reports, Blog entries, complaints, pro/cons, etc. As another example, if the end user is a consumer group relating to adult medical home care, the end user might ask for all information which the service provider can find relating to adult medical home care costs.

Figure 10:
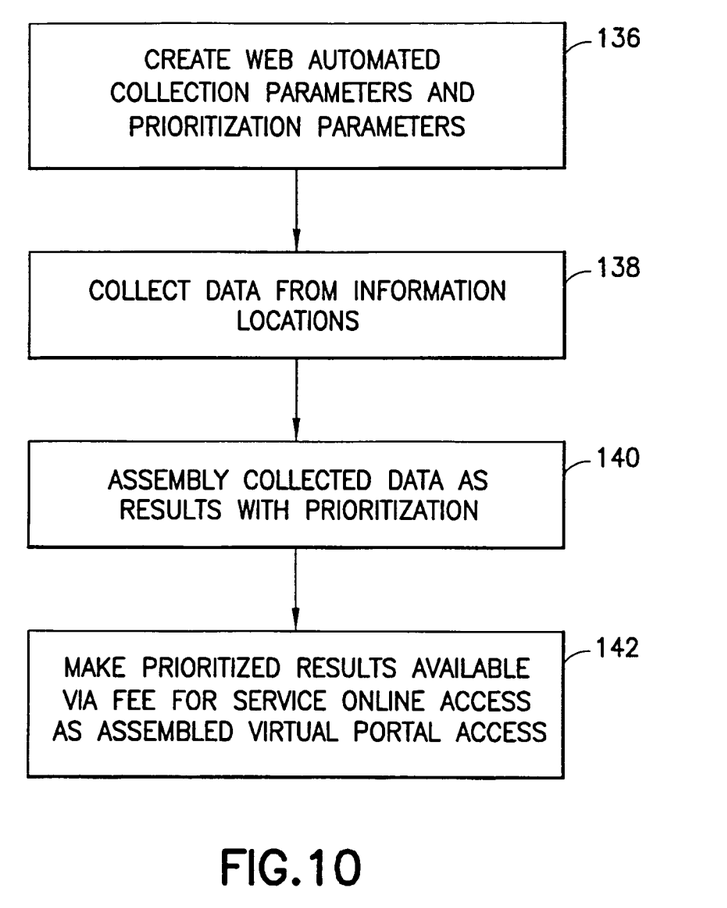
FIG. 10 is a flow chart of steps used in one example embodiment of the invention.

Referring also to FIG. 10, once the service provider knows what type of information the end user desires, the service provider 118 will create web automated collection parameters and prioritization parameters as indicated by block 136. The collection parameters will be specific to the type of information which the end user desires; widgets, model "A" cars, etc. The service provider will also identify specific information locations 114 for these collection parameters to be used. Thus, the search can exclude information locations not identified as desired information locations. Alternatively, all information locations could be included, but the identified targeted locations could be given a higher prioritization in the results made available to the end user.

Prioritization parameters can include, for example, targeted information location(s) as noted above and identified organizational parameters. The identified organizational parameters can be used to organize the collected data into different categories for viewing by the end user. The categories can include, for example, competitors products roughly equivalent to the end user's product, negative information or complaints regarding the user's product, positive comments regarding the user's product, negative information or complaints regarding a competitor's product, positive comments regarding the competitor's product, etc. For example, if a news article relating to the end user's product contains the word "good", the article or a predetermined portion of the article could be listed under positive comments. Likewise, if a blog article relating to the end user's product contains the word "bad" or "poor", the article or a predetermined portion of the article could be listed under negative comments. An article or portions of an article could be listed under multiple categories.

The collection parameters and prioritization parameters are then stored in the memory 132 and used by the search engine 130 to accomplish searching. Searching could be preformed only once, but in a preferred embodiment searching by the search engine 130 is accomplished periodically, such as daily, weekly or even several times each day. In a preferred embodiment, the less interval between searches, the greater the fee charged to the end user. As indicated by block 138, the information is collected by the search and is stored at the service provider. This might include links to the information locations where the data was obtained.

As indicated by block 140, the service provider is able to assemble the collected data as results with the results being prioritized and/or organized as specified by the prioritization parameters. This is accomplished by the controller 122 for subsequent viewing by the end user.

As indicated by block 142, the assembled prioritized results are made available via a "fee for service" online access as an assembled virtual portal access to the information in the information locations 114. This can provide almost real time access to information and data on the information locations 114 to the end user computer 112 via one link to the service provider 118. The fee charged to the end user by the service provider could be a flat period fee, such as a monthly fee or annual fee for example, or a per results viewing fee for example.

The targeted information location identifications could be updated weekly for example. Thus, the search collection parameters and prioritization parameters need not be static. Any suitable presentation and analysis tools could be used to present the information to the end user. There could be a highlighted index or a relationship link analysis for the search and display of results. The display of the information could be a spread sheet or pie chart, for example. For example, positive comments about a product could be charted relative to negative comments about the same product, wherein the software of the search engine is adapted to determine if there are positive and negative comments about a product in an article or web page or blog.

Unlike data mining, the invention can prioritize collected information and organize the collected information in any suitable organization scheme rather than mere results of data mining. Thus, a type of assembled and organized entity extraction from multiple different locations can be provided, and this can be continuously updated by repeating the same search (or a slightly updated search) over and over again. Thus, intelligent information can be provided to the end user which comprises informational intelligence from its automated gathering and assembly into the results shown to the end user. This provides a business intelligence portal, supplied by the service provider to the end user, that has previously not been available.

Figure 11:
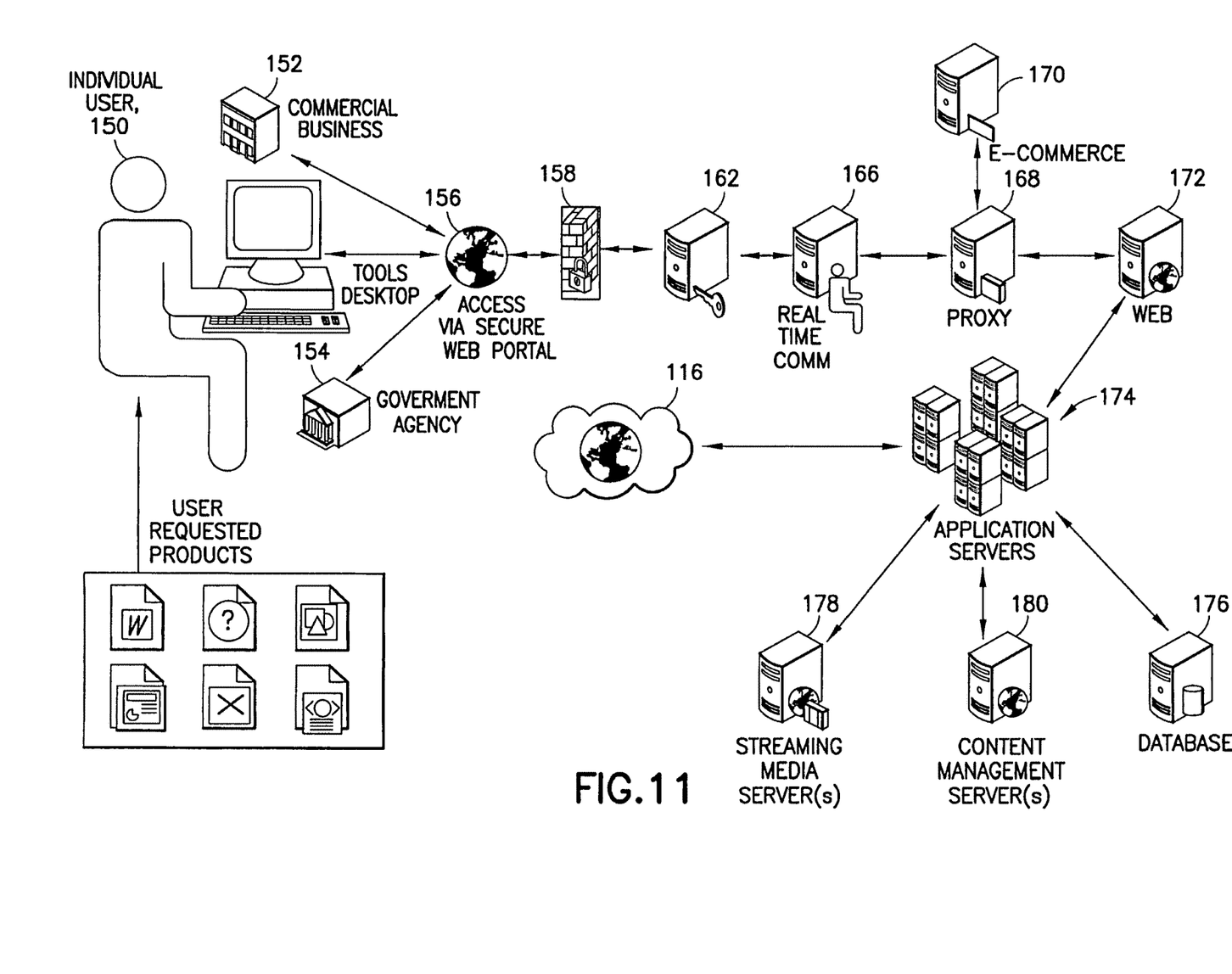
FIG. 11 is a diagram illustrating components of one example embodiment of the invention.

Referring also to FIG. 11, a diagram illustrating one type of virtual intelligent information portal workflow is shown. A user 150 can register for a service provided by the service provider. The user can provide information criteria and result requirements, such as:

A redacted document;
An extracted information file;
Business intelligence, such as performance metrics and/or competitor marketing analysis; and
Business analytics, such as linkage analysis and/or timeline analysis.

The results can then be passed back to the user. User requested products can comprise any suitable type of data files including a MS Word file or an MS Excel spread sheet for example. The individual user 50 can have suitable desktop tools on his computer, and the user could be a commercial business 152 or a government agency 154.

Access to the service provider can be through a secure web portal 156. The user can connect via encryption software, such as PKI or PGP keys as indicated by 162, but would be otherwise blocked as indicated by 158. As indicated by 166, real time communications can be provided via a proxy 168 which can be connected to an E-commerce provider 170, such as PAYPAL™ for example.

The user can connect via the Internet 172 to one or more servers 174 of the service provider having applications and which is connected to a database 176 having stored documents. The application servers can also be connected to a streaming media server(s) 178 and a content management server(s) 180. The application servers 174 are connected to the Internet or the World Wide Web 116 and information location by suitable software and can use software such as WEBAUTOMATOR™, CELWARE™, and TERADACTOR™ provided by CelCorp Inc. to extract and present the desired information/data to the user. The software tool can use redaction software to filter the collected information, as well as business intelligence software and business analytics software. This can provide a virtual intelligent information portal workflow to the user by the service provider.

One aspect of the invention could comprise creating a file based upon the assembled and organized results, and then redacting portions to form a redacted document (electronic document or non-electronic document). For example, if the file has areas cells or areas A, B and C with different information, automatic redaction rules might to applied based upon the service paid for by the customer. For example, if the customer paid for a premium service, all three cells or areas could be viewed. If the customer paid for an intermediate service, only cells A and B could be viewed; area C being redacted. If the customer paid for a low cost service, only cell A could be viewed; areas B and C being redacted. Thus, only one file needs to be created, but different redaction rules can be applied. The customer, upon seeing that redacted areas exist (and perhaps their size), might then agree to pay for the higher cost service.

One aspect of the invention could comprise creating a file based upon the assembled and organized results wherein the results include redacted documents, wherein the redacted documents are obtained by the service provider by one of the redaction processes noted above. Thus, as part of the business intelligence portal, the customer can have access to automatically redacted versions of documents obtained or created by the service provider's interaction with another agency, such as a government or government agency for example.

It should be noted that a document need not be a paper-type of scanned document for the invention to be used. The invention could be used with a document which is initially created as an electronic document. Thus, the process step 82 shown in FIGS. 7A and 7B might be "creation of an electronic un-redacted form of a document" rather than "scan". For example, a document might be originally created on a person's computer wherein the document has information (for example a home address or social security number) which might be desired to be redacted in some circumstances. When the electronic document is saved, the software could be configured to save a redacted version of the document as well as a non-redacted version of the document, and/or a non-redacted version of the document but which is modified to include redaction instruction information for certain fields/areas when the document is opened, copied or downloaded for example.

As another example, a patient's medical chart might be entirely electronic in a hospital or doctor's office (only an electronic version of the chart/document exists); never having been a physical paper document. This electronic only document/chart could be saved when it is created as a redacted version of the document as well as a non-redacted version of the document, and/or a non-redacted version of the document but which is modified to include redaction instruction information for certain fields/areas when (under certain circumstances) the document is opened, copied or downloaded for example.

When the chart (or a portion of the chart) is downloaded or sent to an insurance company, only the previously saved redacted version might be sent, or the un-redacted version might then have certain areas or cells automatically redacted at that time such that certain information is not downloaded or sent to the insurance company. In this "electronic original document version" of the invention, the rules set would be programmed based upon locations/fields in the electronic original document, and what information is contained/input into those locations/fields. For example, the rules set could identify a "social security number" field for redaction when the electronic original document is printed, copied or downloaded/sent to an entity other than the original owner of the electronic original document.

It should be understood that the foregoing description is only illustrative of the invention. Various alternatives and modifications can be devised by those skilled in the art without departing from the invention. For example, features recited in the various claims (dependent claim(s) and/or independent claim(s)) could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A method comprising:
    scanning a plurality of documents by a scanner to form new respective electronic scanned documents, where the plurality of documents comprise at least two different forms of documents which are scanned;
    determining the form of each of the plurality of documents which have been scanned, where the form is determined based, at least partially, upon the scanning of the plurality of documents by the scanner; and
    based upon an initial opening event of at least one of the new electronic scanned documents transitioning from a non-opened state to an open state, redacting a cell in the at least one new electronic scanned document at a time in which the initial opening event occurs, where the redacting is based upon the determined form of the document which was scanned to form the at least one scanned document, to thereby form a scanned redacted document.

2. A method as in claim 1 further comprising printing a copy of the scanned redacted document with the cell redacted on the copy.

3. A method as in claim 2 wherein the copy is printed by a same machine having the scanner.

4. A method as in claim 1 wherein the scanned redacted document is an electronic file which is not initially printed as a physical paper document.

5. A method as in claim 1 further comprising electronically storing the scanned redacted document in a memory.

6. A method as in claim 5 further comprising electronically storing the scanned document in a memory.

7. A method as in claim 1 further comprising electronically storing the scanned document in a memory.

8. A method comprising:
    opening an electronic non-redacted scanned version of a document by a computer; and
    at an occurrence of an opening event of when the electronic non-redacted scanned version of the document is at a time of transition from a non-opened state to an open state, automatically redacting a portion of the opened electronic non-redacted scanned version of the document based upon at the time of the opening event of the scanned version from the non-opened state to the open state to thereby automatically create a redacted version of the document.

9. A method as in claim 8 wherein redacting the portion of the opened electronic scanned version of the document occurs in a visual editor software program on a client computer.

10. A method as in claim 8 wherein the electronic scanned version of the document is obtained by a client computer from a server through a virtual redaction portal.

11. A method as in claim 8 further comprising:
    scanning a document by a scanner to form the electronic scanned version of the document; and
    determining a form of the document;
    wherein redacting the cell of the opened electronic scanned version of the document is based upon the determined form of the document.

12. A method as in claim 8 further comprising printing a copy of the opened electronic scanned version of the document with the portion redacted on the copy.

13. A method as in claim 12 wherein the copy is printed by a same machine having the scanner.

14. A method as in claim 11 further comprising electronically storing the electronic scanned version of the document in a memory.

15. A method as in claim 11 further comprising electronically storing the opened electronic scanned version of the document in a memory as an electronic un-redacted version of the document at about a same time as the electronic scanned version of the document is stored.

16. A method at in claim 1 further comprising:
creating web automated collection parameters and prioritization parameters;
collecting data from information locations;
assembling collected data as results with prioritization; and
making prioritized results available via fee for service online access as assembled virtual portal access on a server.

17. A method as in claim 16 wherein collecting data from information locations comprises redacting information from a scanned document.

18. A method as in claim 1 where the initial opening event comprises an instruction to open the at least one new electronic scanned document.

19. A non-transitory program storage device readable by a machine, tangibly embodying a program of instructions executable by the machine for performing operations, the operations comprising:
scanning a plurality of documents by a scanner to form a new respective electronic scanned documents, where the plurality of documents comprise at least two different forms of documents which are scanned;
determining the form of each of the plurality of documents which have been scanned; and
redacting a portion in at least one of the scanned documents, based upon the determined form of the document which was scanned to form the at least one scanned document, to thereby form a scanned redacted document, where the redacting is activated upon an initial opening event of when the at least one of the scanned document is initially attempted to be opened.

20. A non-transitory program storage device as in claim 19 where the opening event comprises an instruction to open the at least one scanned document initiating a start of the opening event.

* * * * *